United States Patent [19]

MacCourt

[11] Patent Number: 4,822,962
[45] Date of Patent: Apr. 18, 1989

[54] HYDROSTATIC HITCH CONTROL

[75] Inventor: Fergus J. MacCourt, Winnipeg, Canada

[73] Assignee: Ford New Holland, Inc., New Holland, Pa.

[21] Appl. No.: 476,486

[22] Filed: Mar. 18, 1983

[51] Int. Cl.$^4$ .............................................. H01H 9/06
[52] U.S. Cl. ..................................... 200/61.88; 172/2
[58] Field of Search ............... 200/61.85, 61.88, 61.91, 200/52 R, 157; 172/2, 4.5

[56] References Cited

U.S. PATENT DOCUMENTS

| 3,198,922 | 8/1965 | Rohars | 200/157 |
| 3,428,767 | 2/1969 | Pfeifer | 200/61.89 |
| 4,047,145 | 9/1977 | Schwehr | 200/61.89 X |
| 4,063,217 | 12/1977 | Hyde et al. | 200/61.91 X |
| 4,180,713 | 12/1979 | Gonzales | 200/52 R |
| 4,199,747 | 4/1980 | Miller et al. | 200/61.88 X |
| 4,360,718 | 11/1982 | Schobinger et al. | 200/61.88 |
| 4,378,474 | 3/1983 | Olson | 200/61.88 X |

Primary Examiner—J. R. Scott
Attorney, Agent, or Firm—Larry W. Miller; Frank A. Seemar; Darrell F. Marquette

[57] ABSTRACT

A control system for positioning an implement used on a tractor. A control system selects the direction and speed of a hydrostatically powered tractor. A first switch allows the implement to be raised or lowered and is located on the control lever. A second switch allows the operating position of the implement to be present in an automatic mode and a third switch allows either the automatic or manual mode to be selected. The control lever is movable from its neutral position forwardly or rearwardly by operating a release mechanism.

8 Claims, 7 Drawing Sheets

HYDROSTATIC HITCH CONTROL

INTRODUCTION

This invention relates to a control system for implement operation on a tractor and, more particularly, to a control system used for implement operation which is particularly useful on a hydrostatically powered tractor.

BACKGROUND OF THE INVENTION

In tillage operations, a tractor operator must position the implement with care in order to obtain the proper optimum depth for cultivating. After the implement has been so positioned, it may be necessary to remove the implement from this operating position due to the end of a row being reached or some other operation. The implement operating position will have to be obtained again causing repetition of the optimum depth locating operation by the operator.

In hydrostatically powered tractors, forwardly and rearwardly directed movement is controlled by a single control lever which is moved forwardly or rearwardly to select the appropriate speed and direction of the tractor. The "neutral" position (i.e., where the vehicle is not being driven) is located in the control midway between the full forward and full rearward lever positions.

The use of hydrostatic drive with its inherent need for multiple hand controls becomes of concern when an implement is attached. When the operator has reached the end of a row, for example, the sequence of operations includes slowing the tractor, raising the implement, turning the tractor, lowering the implement, and increasing the tractor speed. Thus the operator must momentarily give up control of either the steering wheel or the hydrostatic drive control to operate the implement. This problem similarly exists when the implement must be constantly adjusted or repositioned while the tractor is moving forwardly in its operating attitude. This is disadvantageous since the practice is unsafe, the operator has more functions to perform and the tractor is momentarily not under complete control.

SUMMARY OF THE INVENTION

According to one aspect of the present invention, there is disclosed a vehicle control system comprising a control lever first switch operable to select the speed and direction of movement of a vehicle, means operable to raise or lower the height of an implement adapted to be attached to said vehicle, second switch means operable to define and adjust the operating position of said implement and third switch means operable to select either a manual or automatic operating mode of said control system, said switch means being inoperable when said third switch means is in said manual mode.

According to a further aspect of the invention, there is disclosed a vehicle control system for a hydrostatically powered tractor, said system comprising control lever means operable to select the speed and direction of movement of said tractor and being movable from neutral to fully forward and fully readward positions, engagement means to allow said lever means to move from said neutral to fully forward and fully rearward positions when said engagement means is disengaged, first switch means on said control lever means to control the raising and lowering of an implement, second switch means operable to define and adjust an implement operating position and third switch means operable to define automatic and manual implement positioning modes, said second switch means being inoperable when said third switch means is in said manual operating mode.

BRIEF DESCRIPTION OF THE SEVERAL VIEWS OF THE DRAWINGS

An embodiment of the invention will now be described, by way of example only, with reference to the accompanying drawings in which.

DESCRIPTION OF SPECIFIC EMBODIMENT

Figure 1:
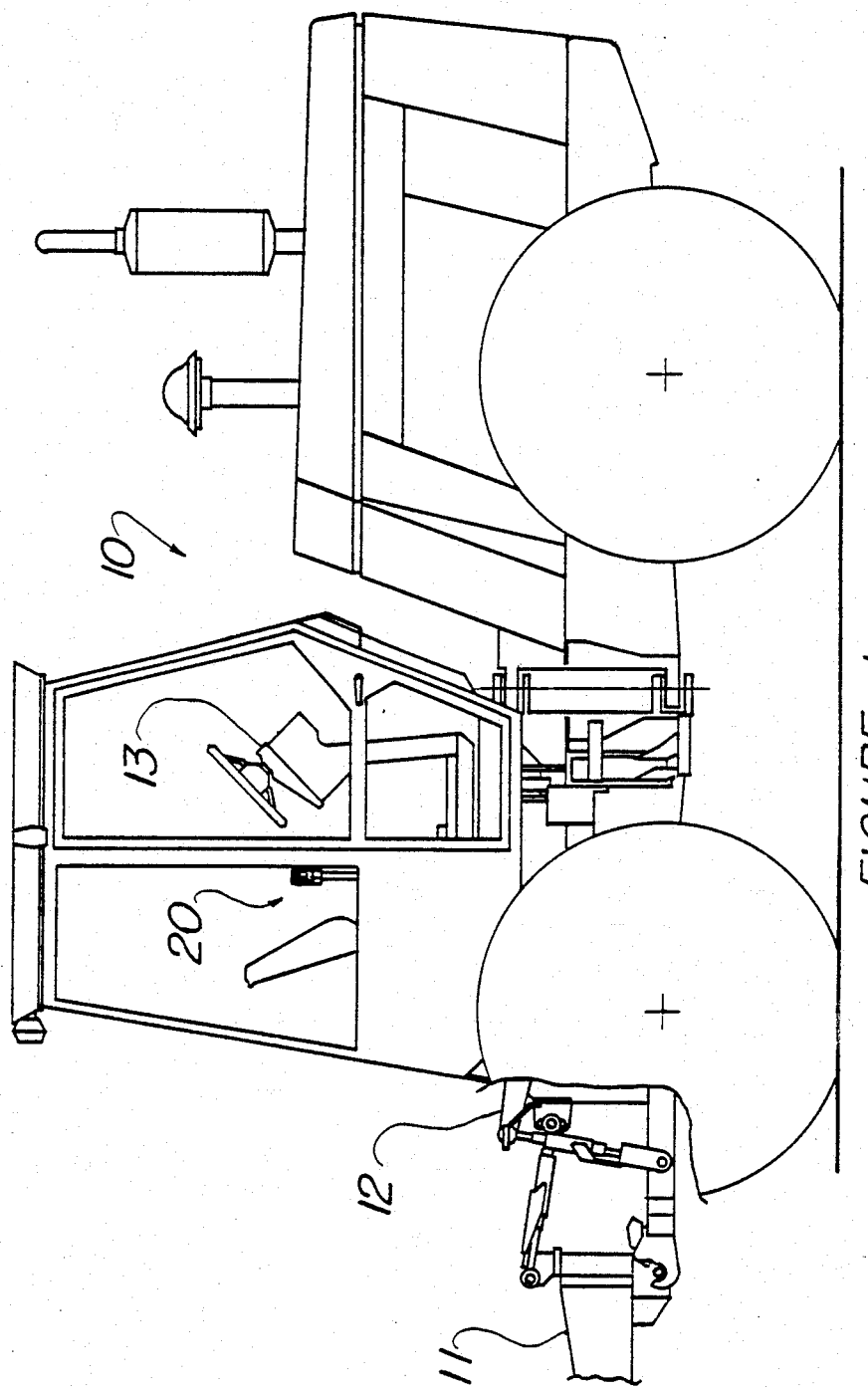
FIG. 1 is a side view of a hydrostatically powered tractor with a partial view of an attached implement.

Referring now to the drawings, a hydrostatically powered tractor is shown generally at 10 in FIG. 1. It has an implement 11 attached to a standard three point hitch shown generally at 12 which is controlled hydraulically. A control lever shown generally at 20 is situated beside the operator's side console 13. Control lever 20 can move forwardly and rearwardly.

Figure 2:
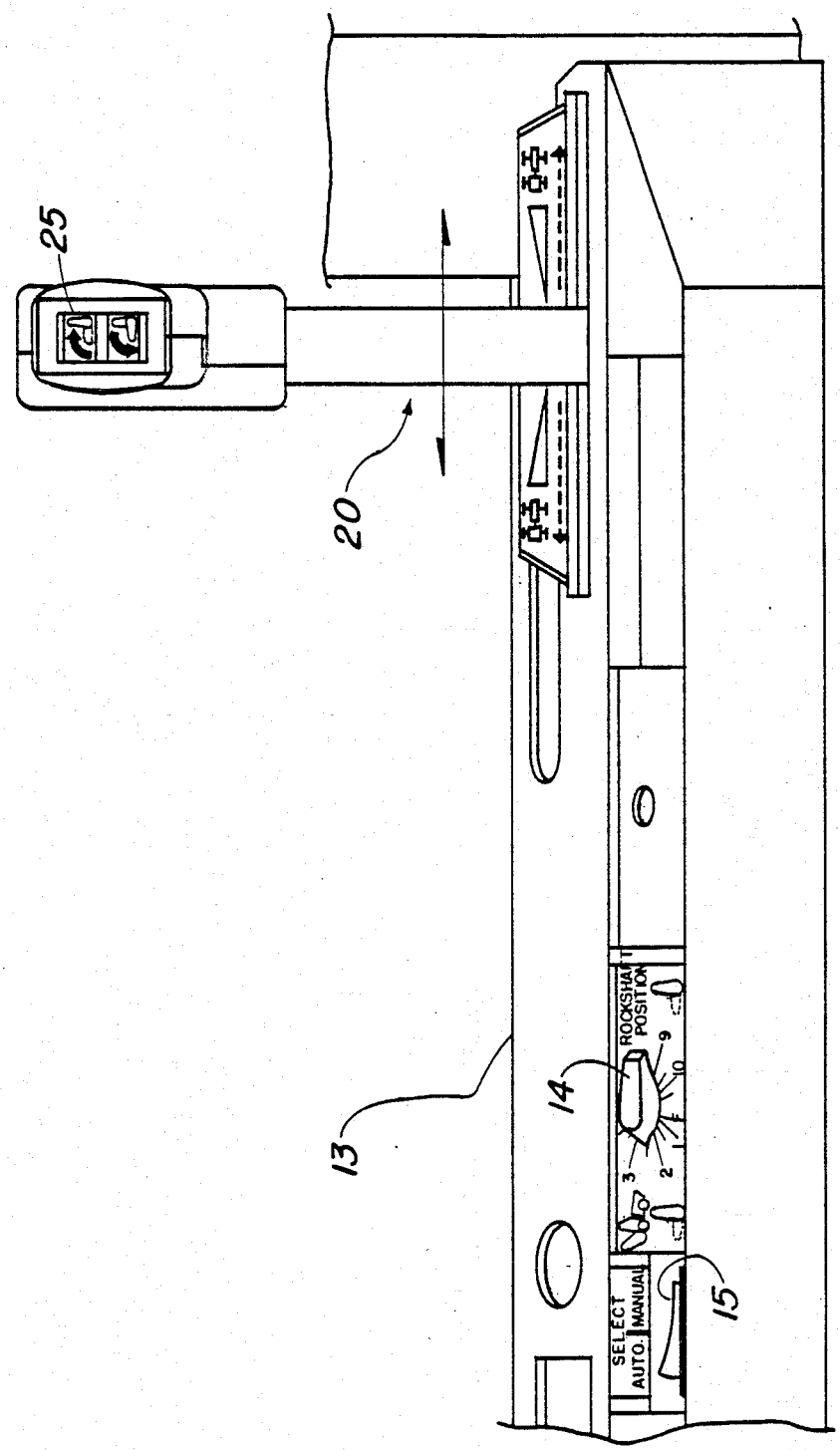
FIG. 2 is a view of a portion of the operator's side console in the tractor of FIG. 1.

A portion of the dashboard of the tractor's operator's side console 13 with the control lever 20 is shown in FIG. 2. It comprises, besides the control lever 20, a first rocker switch mounted in the handle of the control lever 20, a rotary switch 14 and a second rocker switch 15. The control lever 20, can be moved forwardly and rearwardly in the directions indicated by the arrow.

Figure 3:
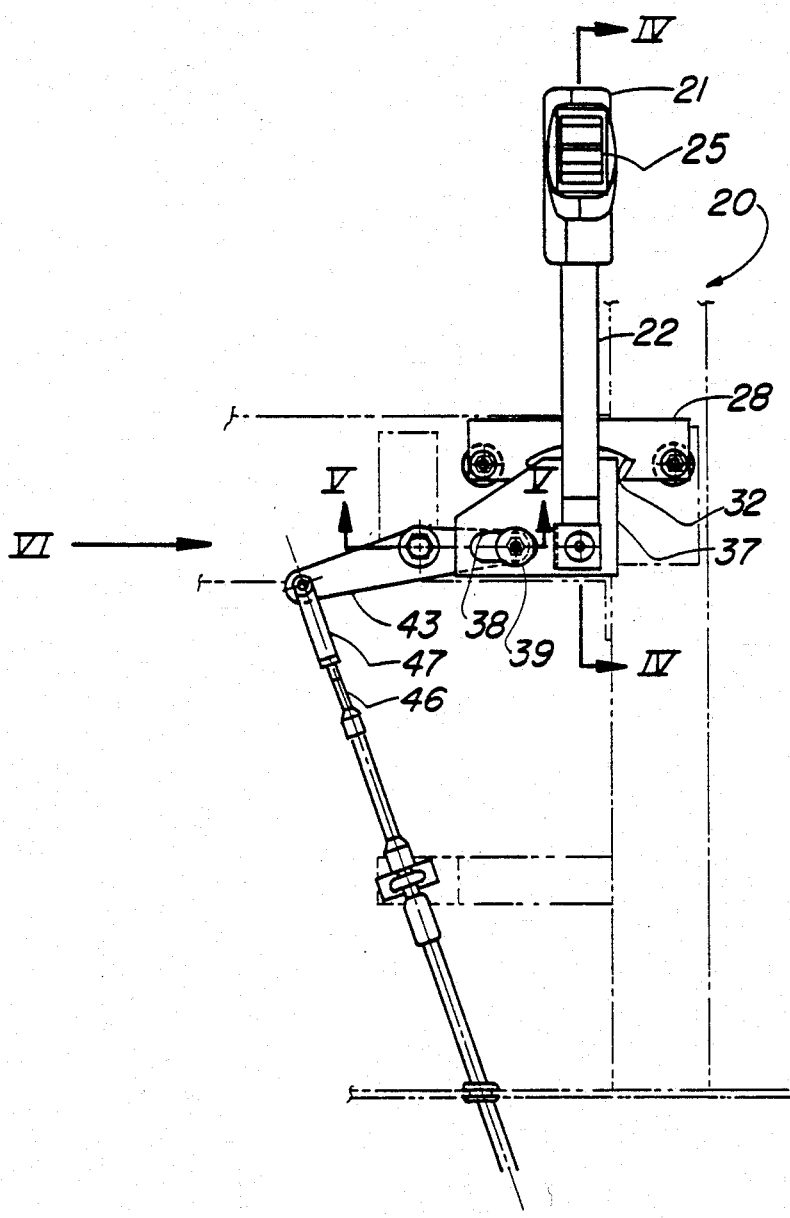
FIG. 3 is an enlarged view of the control lever.
Figure 4:
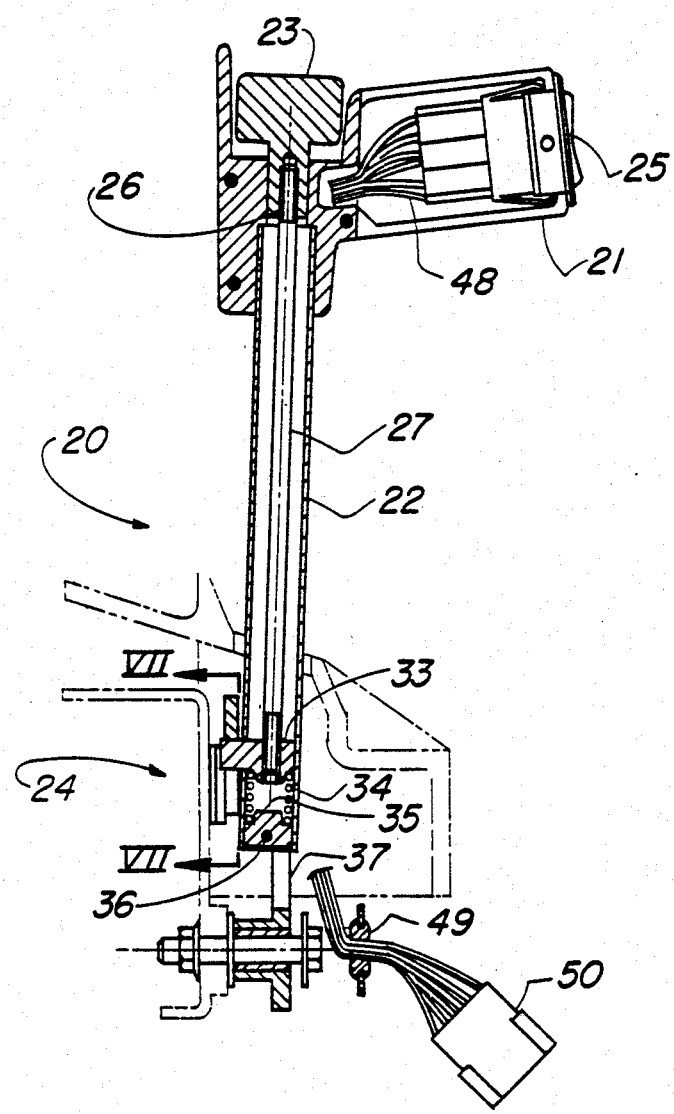
FIG. 4 is a view taken along IV—IV of FIG. 3.

The control lever 20 is shown in more detail in FIGS. 3 and 4. It comprises a handle 21, a lever portion 22, a release button 23 and a locking mechanism shown generally at 24.

A first rocker switch 25 is housed within the handle 21 of the control lever 20.

Referring to FIG. 4, the release button 23 has a recess 26 into which is inserted a pushrod 27. Pushrod 27 is retained within the recess 26 by threads. An adhesive material such as LOCTITE (Trade Mark) is applied to the threads of the pushrod 27.

Figure 6:
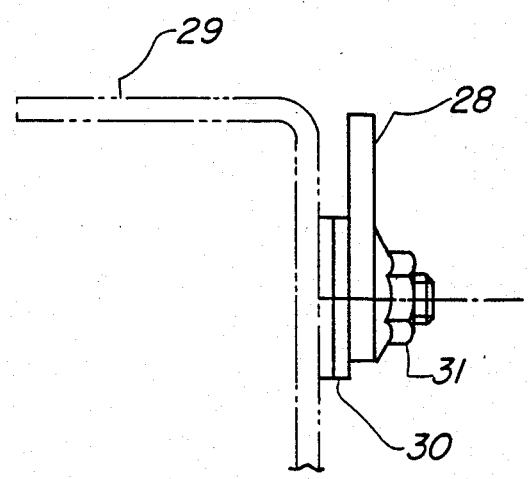
FIG. 6 is a view taken along VI in FIG. 3.
Figure 7:
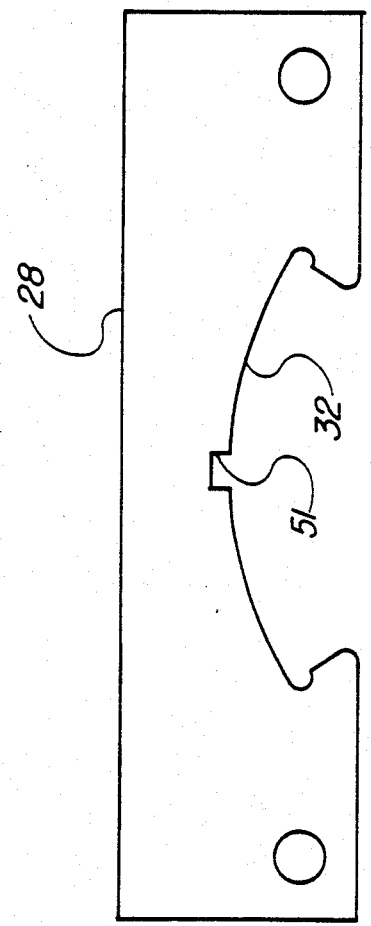
FIG. 7 is a view taken along VII—VII of FIG. 4.

A detent plate 28 (also shown in FIG. 6) is mounted to the frame 29 of the tractor using washers 30 and twin hex nuts 31. The detent plate 28 has an arcuate recess 32 therein (FIG. 7) within which a slidelock 33 is adapted to move. At the 12 o'clock position in the arcuate recess 32, a rectangular recess 51 is positioned to allow entrance and restraint of the slidelock 33. Slidelock 33 is adapted to fit on the end of pushrod 27 and is restrained in that position by compression spring 34 which acts upwardly on the slidelock 33. A spring retaining block 35 is fitted at the bottom of lever 22 and is restrained in position by a cotter pin 36.

Figure 5:
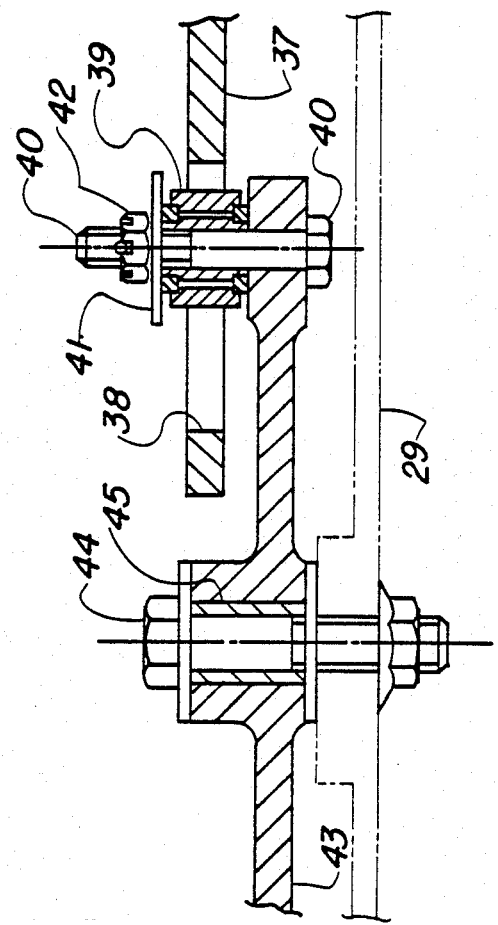
FIG. 5 is a view taken along V—V of FIG. 3.

Arm 37 (FIG. 3) is mounted on lever 22 and rotates therewith. It extends outwardly from control lever 20 and on one side, an arcuate recess 38 is machined. A cam follower 39 is fitted on bolt 40 and is retained thereon by washer 41 and slotted hex nut 42 (FIG. 5).

Bolt 40 fits through link 43 which is rotatably mounted on frame 29 by hex cap screw 44 and bushing 45. A clevis 47 (FIG. 3) extends from link 43 and a cable is attached to the end of clevis 47. Cable 46 extends, through linkages, to a hydraulic pump (not shown) which inititates movement of the tractor.

As seen in FIG. 4, rocker switch 25 is inserted into handle 21 of control lever 20 and a wiring harness 48 is connected to the rocker switch 25. The wires from the wiring harness 48 extend downwardly a distance through control lever 20 and emerge at a position above the locking mechanism 24. They pass downwardly and are retained by grommet 49. From grommet 49, the wires pass to a connector 50 and then pass to an appropriate control mechanism for raising and lowering the three point hitch which will not be further described.

Referring again to FIG. 2, a rotary switch 14 is shown on the dashboard of the operator's side console 13. The rotary switch 14 is connected to an appropriate electrical circuit (not shown) which will operate to define the lowermost position of the implement when the implement is in the "automatic" mode as explained hereafter. The lowermost implement position will depend on the position of the rotary switch 14 which also acts to define a "floating" implement mode. When the rotary switch 14 is rotated to the "F" or "floating" position, and the implement is in the "automatic" mode, the implement will then "float" on the ground surface following the contour of the terrain on which the tractor is being operated. This mode would be used if, for example, there were wheels on the implement being used. Rotary switch 14 can also be rotated to raise and to lower the attached implement when the implement is being operated in the "automatic" mode.

Yet a further rocker switch 15 is depicted in the operator's side console 13 of FIG. 2. The second rocker switch 15 is operable to select either the "automatic" or "manual" mode. When the "manual" mode is selected, the rotary switch 14 is removed from the circuit and is therefore inoperable. The implement 11 will therefore be operable only from the first rocker switch 25.

OPERATION

In operation, it will be assumed the tractor 10 is not moving and control lever 20 is in the neutral shift position depicted in FIG. 2. The engine r.p.m. will also have been set by the appropriate throttle (not shown) adjustment.

To move the tractor 10, the operator presses vertical release button 23 (FIG. 4). The release button 23 will move the pushrod 27 downwardly together with attached slidelock 33. The slidelock 33 will move out of contact with the rectangular recess 51 at the 12 o'clock position in the detent plate 28 (FIG. 7) allowing the control lever 20 to move forwardly or rearwardly as desired. Arm 37 will rotate with lever portion 22 and cam follower 39 will rotate link 43 and attached cable 46. Thus cable 46 will increase the supply of fluid passing from the hydraulic pump and, hence, the power supplied to the tractor wheels.

The operator is able to select either the "automatic" or "manual" mode of implement operation by utilizing rocker switch 15. It will first be assumed the operator selects the "automatic" mode. This mode is selected by appropriately pressing the automatic side of rocker switch 15.

If the operator then presses the "down" or lower side of rocker switch 25 in control lever 20, the implement 11 will lower automatically until it reaches the operating position defined by the position of rotary switch 14. Conversely, if the operator presses the "raise" or higher side of rocker switch 25, the implement 11 will raise until the uppermost position of the implement is reached.

With the "automatic" mode selected by second rocker switch 15, the operating position of the implement may be controlled by rotary switch 14 with the tractor underway. Accordingly, if the operator requires frequent changes in the operating depth of the implement, he will manipulate rotary switch 14 until the necessary adjustment is provided.

A further feature provided by the rotary switch 14 is the "floating" or "F" mode. If the rotary switch 14 is moved to the position depicted "F" in FIG. 2, the implement will follow the ground contour by "floating". This "F" position would be selected, for example, when the implement has wheels.

It will now be assumed the operator desires the "manual" mode of implement operation. The operator will press the "manual" side of rocker switch 15. In this operating mode, the rotary switch 14 is entirely removed from the circuit. Accordingly, the operator will have complete control of raise and lower operations by pressing the appropriate part of rocker switch 25. If he presses the lower portion of rocker switch 25, the implement will be lowered until he releases the rocker switch 25 and vice versa.

Thus, the operator may control the depth of the implement 11 by manipulating the rocker switch 25 while simultaneously controlling the direction and speed of the tractor with control lever 20.

When the operator desires to slow down or stop the tractor 10 when proceeding forwardly or rearwardly, he pulls the control lever 20 in the direction of the operator or rearwardly as seen in FIG. 1. The slidelock 33 will remain in contact with arcuate recess 32 because of the action of compression spring 34 which is acting against the spring retaining block 35. When the handle 21 reaches the neutral position, the slidelock 33 will enter the recess 51 in the midmost arcuate position of detent plate 28. This will restrain the control lever 20 from further movement until the release button 23 is again depressed to allow further handle movement.

The rocker switch 25 may be controlled independently of the movement of the handle 21. Accordingly, when the handle 21 is in the neutral position, rocker switch 25 may be pressed to raise or lower the attached implement 11.

The hitch control system described is particularly applicable to hydrostatically powered tractors. Nonetheless, the system may be utilized in ordinary mechanically powered tractors as well. In this event, the rocker switch 25 need not be positioned in the control lever 20. It could, for example, appear at a convenient position in the operator's side console together with the rotary switch 14 and the rocker switch 15, all of which will serve the same respective functions relating to the tractor hitch.

It is also possible to include a further or second three point hitch on the engine end of the tractor 10. In this event, a further set of controls may be utilized. Those controls will act identically to the first set described herein except that switch 25 will be mounted in the operator's side console 13 rather than in the control lever 20 as described in the case of a mechanically powered tractor.

Accordingly, there has been described a hitch control system in which many modifications may be made without departing from the scope of the invention which should be construed by reference to the accompanying claims.

I claim:

1. A vehicle control system comprising a control lever operable to select the speed and direction of movement of a vehicle, first switch means in said control lever operable to raise or lower the height of an implement adapted to be attached to said vehicle, second switch means operable to define and adjust the operating position of said implement and third switch means operable to select either a manual or automatic operating mode of said control system, said second switch means being inoperable when said third switch means is in said manual mode.

2. A vehicle control system as in claim 1 wherein said second switch means is also operable to adjust said operating position of said implement when said third switch means is in said automatic mode.

3. A vehicle control system as in claim 2 wherein said second switch means is further operable to allow said implement to follow the contour of the ground on which said vehicle is being operated.

4. A vehicle control system as in claim 3 wherein said first switch means is a rocker switch, one side of said rocker switch being operable to raise said implement and the opposite side of said rocker switch being operable to lower said implement.

5. A vehicle control system as in claim 4 wherein said second switch means is a rotary switch, the operating position of said implement being dependent on the degree of rotation of said rotary switch.

6. A vehicle control system as in claim 5 wherein said third switch means is a rocker switch, one side of said rocker switch being adapted to select said automatic mode wherein said rotary switch is operable to select the operating position of said implement, the opposite side of said rocker switch being adapted to select the manual mode wherein said first switch means is operable to select the operating position of said implement.

7. A vehicle control system for a hydrostatically powered tractor, said system comprising control lever means operable to select the speed and direction of movement of said tractor and being movable from neutral to fully forward and fully rearward positions, engagement means to allow said lever means to move from said neutral to said fully forward and fully rearward positions when said engagement means is disengaged, first switch means on said control lever means to control the raising and lowering of an implement, second switch means operable to define and adjust an implement operating position and third switch means operable to define automatic and manual implement positioning modes, said second switch means being inoperable when said third switch means is in said manual operating mode.

8. A control system as in claim 7 wherein said second switch means is further operable to define a floating operating position for said implement when said third switch means is in said automatic positioning mode.

* * * * *